(12) United States Patent
Koch et al.

(10) Patent No.: US 8,090,557 B2
(45) Date of Patent: Jan. 3, 2012

(54) QUALITY ASSURANCE METHOD WHEN OPERATING AN INDUSTRIAL MACHINE

(75) Inventors: David Koch, Nürnberg (DE); Volker Kreidler, Hechingen (DE); Wolfgang Mutscheller, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 449 days.

(21) Appl. No.: 11/921,260

(22) PCT Filed: Sep. 21, 2005

(86) PCT No.: PCT/DE2005/001662
§ 371 (c)(1),
(2), (4) Date: Apr. 1, 2009

(87) PCT Pub. No.: WO2006/128401
PCT Pub. Date: Dec. 7, 2006

(65) Prior Publication Data
US 2009/0204249 A1 Aug. 13, 2009

(30) Foreign Application Priority Data
May 31, 2005 (DE) .......................... 10 2005 025 338

(51) Int. Cl.
*G06F 17/50* (2006.01)
(52) U.S. Cl. ................... 703/1; 703/6; 700/97; 700/182
(58) Field of Classification Search ............... 703/6, 1; 700/97, 182
See application file for complete search history.

(56) References Cited

U.S. PATENT DOCUMENTS

| | | | | |
|---|---|---|---|---|
| 5,208,763 A | | 5/1993 | Hong et al. | |
| 5,689,332 A | * | 11/1997 | Ellingson et al. | 356/237.1 |
| 5,757,496 A | * | 5/1998 | Yamazaki | 356/600 |
| 5,808,432 A | * | 9/1998 | Inoue et al. | 318/561 |
| 6,266,572 B1 | * | 7/2001 | Yamazaki et al. | 700/96 |
| 6,606,528 B1 | | 8/2003 | Hagmeier et al. | |
| 6,968,247 B2 | | 11/2005 | Rathke et al. | |
| 6,975,913 B2 | | 12/2005 | Kreidler et al. | |
| 7,219,041 B2 | | 5/2007 | Hamann | |
| 7,333,874 B2 | | 2/2008 | Taub et al. | |
| 7,373,284 B2 | | 5/2008 | Stabelfeldt et al. | |
| 7,536,234 B2 | | 5/2009 | Kopelman et al. | |
| 2002/0193972 A1 | * | 12/2002 | Kudo et al. | 703/1 |
| 2004/0157188 A1 | | 8/2004 | Luth et al. | |

FOREIGN PATENT DOCUMENTS

| | | |
|---|---|---|
| DE | 10114811 A1 | 10/2002 |
| DE | 10152765 A1 | 5/2003 |
| DE | 103 11 027 A1 | 9/2004 |
| DE | 10346589 A1 | 5/2005 |
| EP | 0 879 675 A1 | 11/1998 |
| JP | 07302108 A | 11/1995 |
| WO | 9819822 A1 | 5/1998 |

* cited by examiner

*Primary Examiner* — Dwin M Craig

(57) ABSTRACT

There is described a method for operating an industrial machine, the latter being e.g. a processing machine, a production machine or a manipulation robot. At least part of the operation of the industrial machine is simulated with the aid of a simulation model and the simulated results and real-time data from the operation of the industrial machine are stored. The simulation can be carried out in the industrial machine and if this is the case a parametric representation of the simulation model can be at least partly produced using a unit for this purpose. To produce the parametric representation, a data-systems connection can be created between the industrial machine and the unit, by means of an Intranet and/or an Internet connection. In addition, the simulation can be carried out in an external simulation unit, the latter having a data-systems connection to the industrial machine by means of an Intranet and/or an Internet connection.

20 Claims, 3 Drawing Sheets

QUALITY ASSURANCE METHOD WHEN OPERATING AN INDUSTRIAL MACHINE

CROSS REFERENCE TO RELATED APPLICATIONS

This application is the US National Stage of International Application No. PCT/DE2005/001662, filed Sep. 21, 2005 and claims the benefit thereof. The International Application claims the benefits of German application No. 10 2005 025 338.5 DE filed May 31, 2005, both of the applications are incorporated by reference herein in their entirety.

FIELD OF INVENTION

The present invention relates to a quality assurance method when operating an industrial machine. The industrial machine is, for example, a processing machine, a production machine or an automated manipulation device. A processing machine is understood, for example, to be a machine tool which is used, for example, to carry out a turning process, a milling process or else a grinding process. A production machine is, for example, a plastic injection molding machine, a bag forming, filling and sealing machine or else a printer. In addition, a production machine can also be a lifting device which is provided, for example, as a crane for transporting goods. A typical example of an automated manipulation device is a robot.

BACKGROUND OF INVENTION

The operation of such an industrial machine can be simulated. If the industrial machine is a processing machine for processing a workpiece, when a workpiece is designed, not only technological and geometric but also qualitative parameters are advantageously defined. The determination of and testing for compliance with the qualitative parameters can be carried out during or after fabrication. The scope and time of this monitoring can be arranged, for example, according to technological or economic requirements. However, as a rule it is advantageous to determine deviation of actual variables with respect to setpoint variables at an early time so that in particular relatively high subsequent costs such as post-processing or total loss of the workpiece can be avoided. In order to monitor technological, geometric or else qualitative parameters, operations are usually carried out with a quality assurance process. This process accompanies, for example, the definition, the design and the fabrication of a workpiece. In this way it is possible, for example, to create a specification which defines which parameters (technological, geometric . . . ) are relevant to the quality of a workpiece, and in what way these parameters are to be monitored and documented. The greater the number of parameters which are monitored, the greater the expenditure required.

In order to ensure compliance with the abovementioned parameters, as a rule, measurements are carried out at specific times during or after a production process. Such a measurement relates, for example, also to the surface quality or to a tolerance value of a geometric dimension. Quality assurance consequently often takes place in subsequent process steps on machines which are specially provided for this purpose, which involves a corresponding high level of complexity and costs. A customary procedure is for process data to be obtained from the fabrication of a workpiece and for its quality to be checked by measurements. During the processing of further identical parts (workpieces), the process data which is then measured can be compared continuously with the data of the satisfactory part. It is thus possible to determine deviations from setpoint variables at an early time. However, this procedure is laborious and very time-consuming.

The operation of the industrial machine also relates, in particular, to the processing of a workpiece on a numerically-controlled processing machine. A computer numerically-controlled processing machine (CNC machine) is also understood to be a numerically-controlled processing machine in this context, and the processing machine can be a machine tool. Two or more processing steps can be provided for the processing of the workpiece. A method for processing a workpiece thus also includes a simulation method for three-dimensional processing by a CNC-controlled processing machine, in particular a milling machine and a descriptive data record which is necessary for this purpose.

In numerically-controlled processing machines, such as in particular CNC-controlled processing machines, a workpiece is either encoded directly by a programmer or the workpiece is modeled by means of a CAD system and then converted into an equivalent CNC parts program. The CNC parts program or the CAD model corresponds here to idealized processing instructions for the processing machine. The CNC program is loaded into a CNC controller and the processing machine is controlled in accordance with the CNC program. If the workpiece which is fabricated in this way lies within the desired fabrication tolerances of an ideal workpiece, no problems occur with this procedure. If, on the other hand, the fabricated workpiece does not correspond to the requirements, the question arises as to which variations are to be used for the fabrication of a satisfactory workpiece.

In order to correct faults, it is possible for individual processing instructions and/or individual operating parameters of the processing machine to be changed successively, for a new workpiece to be fabricated and then for this newly fabricated workpiece to be checked, but this procedure is very awkward and also costly, material-intensive and time-intensive. This applies particularly also because it is often not known where to look for the cause of the deviations of the actually fabricated workpiece from the desired workpiece.

EP 0879675 discloses a simulation method for NC machining on the basis of a shape of a workpiece, a shape of a tool and an NC program, which is intended to achieve feed forward control and optimum cutting conditions, and DE 10311027 discloses a measuring and simulation system for machine tools or production machines which simultaneously visualizes measurement and simulation results on a common screen, in which case an operator has to perform the subsequent comparison of the measurement and simulation results.

U.S. Pat. No. 5,208,763 specifies a machine tool which is equipped with sensors and which has a data processing system which transmits the position and orientation of a workpiece with respect to a model of the workpiece by means of coordinates of surface points which are determined on the workpiece. On this basis, a transformation of the workpiece is determined and said transformation is intended to produce a smaller difference between the relative spatial coordinates of the workpiece and of the model.

When particularly complex parts are fabricated, in particular in the case of parts with a large volume of removed material, as occurs, for example, in aircraft manufacture or else in turbine manufacture for power plants, a plurality of process steps with different tools are required. Since there is no CAD model for the individual subprocesses for manufacturing a part, the part being a workpiece, it is not possible at present to measure the quality of the subprocesses directly. Only the result of the overall process can be measured on a measuring machine or else on the fabrication machine. This means that even faults which have already occurred in the first process step can always only be detected after the fabrication of the entire part, for example a turbine blade. This procedure can lead, for example, to the following problems:

- Parts/workpieces are always fabricated in a finished state even if an irreparable damage has occurred to the part even just after the start of the fabrication and has not been detected. As a result, valuable machine time is wasted;
- the previously customary measuring of parts on a measuring machine is very cost-intensive since, on the one hand, the measuring machines for large parts are very expensive, and on the other hand the clamping of the in some cases very large workpieces on the measuring machine is extremely laborious;
- faults in the production are often detected only weeks after the fabrication of parts, with the result that under certain circumstances an entire series of parts has been fabricated with faults during this time;
- faults which were detected in a previously known way can be assigned unambiguously to a subprocess only in the rarest cases so that the correction of faults is in turn very laborious because all the subprocesses have to be examined.

SUMMARY OF INVENTION

An object of the present invention is to provide a possible way of detecting faults during, in particular, step-wise processing of a workpiece in a considerably faster, simpler and/or more cost-effective way than in the prior art. This is advantageous in particular with small batch sizes such as, for example, one.

The object is achieved by means of a method which has the features according to an independent claim. Dependent claims form further inventive methods.

In an inventive quality assurance method when operating an industrial machine, at least part of the operation of the industrial machine is simulated by means of a simulation model, wherein simulation results and real data from the operation of the industrial machine are stored. The industrial machine is, for example, a processing machine, production machine or an automated manipulation device. According to the method, it is possible, during the monitoring of the processing quality of the processing machine, to compare process variables measured during the processing with process variables which are calculated from a simulation model. A system for carrying out the method has, for example, a computer which is connected to the open-loop and/or closed-loop controller of the processing machine, for example via a data-transmitting connection using an Intranet or the Internet for the purpose of exchanging information. On the computer, which constitutes a simulation device, there is a simulation model for the industrial machine. Such a model has, in particular, different models for subcomponents of the industrial machine. Models of subcomponents of the industrial machine relate, for example, to an open-loop or closed-loop control simulation, a simulation of kinematics, a simulation of the processing steps (this relates, for example, to a parts program) or the like.

In one embodiment, the computer for the simulation has a connection with a real machine tool for comparing the real, recorded process variables with calculated process variables from the simulation model. The comparison is either carried out simultaneously with the processing or at a later time and is carried out on the computer and/or on the open-loop or closed-loop control device of the machine tool. If the comparison is carried out on the machine tool, the simulation results are transmitted from the computer to the open-loop and/or closed-loop controller of the machine tool. If the comparison is carried out on the computer, with this comparison being carried out, in particular, subsequent fabrication, the process information is transmitted from the machine tool to the computer. The determination of the simulation results is carried out, in particular, using an open-loop control simulation, i.e. a model for the open-loop control on the computer. The configuration of the open-loop control simulation is advantageously carried out via a connection to the machine tool using a data transfer over the Intranet or the Internet. Machine data in the open-loop control are used for the configuration of the simulation. Comparison of data which is carried out is based, for example, on measured and simulated values for a position or orientation of a tool, an axle position, a rotational speed, a velocity or through the comparison of forces which occur.

The method can consequently be configured in such a way that the simulation is carried out on the industrial machine, wherein parametrization of the simulation model can be carried out at least partially by means of a device for parametrizing the simulation model, wherein a data-transmitting connection can be set up by means of an Internet and/or an Intranet connection between the industrial machine and the device for parametrizing the simulation model.

In a further configuration of the method, the simulation can be carried out on an external simulation device, wherein the external simulation device is or can be connected in a data-transmitting fashion to the industrial machine by means of an Intranet and/or an Internet connection.

In previously used methods for quality assurance, process values from the fabrication of a production item were compared with the values of a satisfactory part. The satisfactory part is a part which, according to the specifications, has been fabricated correctly and does not have any faults. This procedure of comparison requires a satisfactory part to be already present. With the method according to the invention it is already possible to monitor the production of the first satisfactory part. This is particularly important for batch sizes of 1, for which previously such quality assurance was not possible. The inventive execution of a simulation makes it possible to generate setpoint data with high procession in advance of the fabrication, and said setpoint data is used directly for quality assurance, while this process can be carried out in parallel with the production process.

The data-transmitting connection of an industrial machine to an external computer via a network, as an Intranet or the Internet constitute, makes it possible to use results directly from work preparation for the purpose of quality assurance in the fabrication process, and to use data from the fabrication process such as, in particular, traces, in the work preparation for the documentation of the production.

A system according to the invention or the execution of this method according to the invention also makes it possible to carry out continuous, safeguarded and documentable monitoring of processing operations according to a defined quality assurance management process. Furthermore, the invention provides the possibility that, for example, workpiece manufacturers can have quality monitored by external devices, for example. These external devices have here, for example, a server which has a data connection to the Internet. The server is provided for carrying out the simulation and/or at least for transferring simulation results.

A further advantageous method relates to the processing of a workpiece on a numerically-controlled processing machine, wherein, in order to process the workpiece, two or more processing steps are required and consequently also provided. In order to perform open-loop and/or closed-loop control of the numerically-controlled processing machine, a processing data record is provided which can run in an open-loop and/or closed-loop control device of the numerically-controlled processing machine together with a program for operating the open-loop and/or closed-loop control device. The processing data record is, for example, at least one parts program. The processing machine is, in particular, a machine tool or else a production machine or an automated manipulation device. A machine tool can be provided, for example, for the following processing methods: drilling, milling, grinding, turning etc. The processing machine has an open-loop and/or closed-loop control device such as, for example, an NC open-loop controller or else a CNC open-loop controller, with such controllers either being integrated into the processing machine or else being functionally assigned to it. In order to operate the open-loop and/or closed-loop control device, an operating system is necessary, which is also referred to as an NC core (NCC). This NC core comprises run time software. According to the inventive method, simulation data are generated. These simulation data are generated from the processing data record together with the program (NCC) for operating the open-loop and/or closed-loop control device in a simulation step. The simulation can take place in one or more steps. The simulation data comprise, in particular, the data which arise due to the processing of the parts program via the NCC. In order to calculate these simulation data, either the real NC core can be used on the open-loop and/or closed-loop control device, or else a simulated NC core can be used. The simulated NC core can also be referred to as a virtual NC core VNCC, the latter running, for example, on a computer which is not provided for the open-loop and/or closed-loop control of the processing machine. The computer is connected in a data-transmitting fashion to the processing machine, via, for example, the Internet and/or the Intranet. In a highly developed embodiment, the VNCC is integrated in the open-loop and/or closed-loop control device. Furthermore, according to the inventive method, after the simulation data have been generated they are transferred to a material erosion simulation, wherein material erosion data which have been simulated from the simulation data are generated. From the simulated material erosion data, it is then possible, by means of a calculation, to calculate the geometry data of the workpiece from the original geometry data of the workpiece and indeed from the actual material erosion data after a specific processing step and/or after any desired processing step. The geometry data after an x-th processing step are then advantageously compared after the x-th processing step with geometry data which has actually been measured. If the measured geometry data corresponds to the calculated—simulated geometry data, the next processing step can be carried out. If the measured geometry data does not correspond to the calculated—simulated geometry data, the deviation of the geometry data can be calculated. Owing to the deviation it is possible to determine in an automated fashion whether the workpiece to be processed can be used further by means of post-processing or whether the workpiece to be processed has to be subjected to further processing. The modification of a processing record for a subsequent processing step or else the recalculation of the processing record for a processing step which is to be newly added is advantageously carried out using the differing geometry data.

In the method according to the invention, a simulation of processing of a workpiece is used. In this context, the data record which describes the processing on the processing machine—the processing data record—is used. Consequently, setpoint processing by means of idealized processing instructions for the processing machine can be determined on the basis of a descriptive initial data record. The initial data record is the description data record here.

By using the method according to the invention it is possible to overcome significant disadvantages of the previously known method for processing a workpiece in a plurality of processing steps on a numerically-controlled processing machine.

Hitherto, NC verification software was used for the simulation, and said software simulated the program for operating the processing machine only in an unsatisfactory way. According to the invention, the software of the NC core itself is now used to generate the simulation data. However, in this context it is also possible to use a virtual NC core VNCC, that is to say an NC core which does not run on the processing machine itself. Since the VNCC reproduces the control behavior precisely, relatively small geometric deviations, which are generated by open-loop control functions such as, for example, a compressor, rounding of a corner or a tool correction, can also already be detected in the simulation. Since such open-loop control functions which are present in the NC core are also taken into account in the generation of the simulation data, their precision is increased significantly. With these data and by using the subsequent material erosion simulation it is possible to calculate very precisely the geometry data of intermediate steps in the processing of a workpiece. Precise monitoring of the accuracy of the progress of the processing is therefore always ensured since measured data can be compared with simulation data.

It is consequently advantageous if data from the processing data record and/or from the program for operating the open-loop and/or closed-loop control device, the NC core, are adopted in the material erosion simulation. The use of the material erosion simulation is, moreover also significant because the NC core (NCC) or the VNCC has already also been taken into account in its initial data, for example tool geometries. Since various tools with different tool geometries can be used to fabricate identical workpieces using just one processing data record, that is to say for example just one parts program, the NCC or the VNCC calculates different initial data as a function of the tool geometry which is known to it. These variation possibilities can be corrected again by the material erosion simulation. Accordingly, simulated geometry data of a workpiece can be generated from material erosion data and can be used for intermediate measurements in order to verify whether the processing of a workpiece is running correctly. Workpiece-specific data, for example radii of milling tools are advantageously transferred automatically from the NCC or the VNCC to the material erosion simulation.

The material erosion simulation is used in one advantageous configuration to generate a measurement program for each substep. Previously only the CAD model was available as a reference for the measurement. That is to say only the completely processed part could ever be measured correctly. NC verification software with a subordinate VNCC is now capable of accurately representing material erosion for each processing step. It is thus able to generate after each step a setpoint geometry which corresponds to a CAD model for each process step. It is thus possible to reference the result of each substep to a geometry model and to generate the predetermined setpoint values for monitoring measurements after each step. These predetermined setpoint values are available, for example, in the form of measurement programs which are loaded onto the machine controller. For each processing program or program section there is now the corresponding measurement program.

The method according to the invention now makes it possible to check the result of each individual processing step directly on the processing machine by, for example, changing the tool for a measuring probe and executing a measuring program. By comparing the setpoint values and actual values, which can both be logged, it is possible for a machine operator to detect directly whether the result of the processing is in the permitted tolerance range. In the event of a fault, the process is interrupted immediately and the fault analysis can be started.

This procedure is significantly simpler than the conventional method since the fault can be assigned to a single processing step. Furthermore, the situation is avoided in which valuable machine time is wasted on a part which is already damaged. If the result of each substep is positive, the measurement records provide proof that the entire process was successful and the part which is generated corresponds to the specifications. Separate measurement on a measuring machine can therefore be dispensed with.

If the quality of the simulation and of the measurement are to be checked in the processing machine by means of a measuring probe, it is additionally necessary to use a measuring machine.

In order to improve the stability of the process of checking processing steps by means of simulation data, the processing machine is standardized periodically. This is ensured, for example, by means of a method which is used to monitor the state of the processing machine and the source of its geometric quality at regular time intervals. This is also referred to as "electronic fingerprints for machine tools and production".

In a further advantageous configuration, the NC core is integrated into a material erosion simulation. This provides, for example, a considerable improvement in the NC programs at the actual programming station. The integration also provides the advantage that a reference geometry which permits automatic measurement of the partial results on the processing machine is generated for each subprocess.

The method according to the invention permits problems in the processing of a workpiece to be detected at the earliest possible time. It is possible to avoid the fabrication process being continued and thus valuable machine time being wasted if incorrect erosion has taken place. The method simplifies to a higher degree the analysis of faults since faults can be assigned directly to a subprocess. Causes of faults are detected more quickly and can thus also be eliminated more quickly. The expensive infrastructure for separate measurement of the finished parts, which is necessary according to the prior art, can be dispensed with by virtue of the method according to the invention without quality suffering as a result.

In a method according to the invention it is possible for a workpiece to be processed in accordance with a first processing data record in a first processing step and for geometry data of the workpiece to be measured, after which the measured geometry data of the workpiece are compared with the simulated geometry data. If the geometry data do not correspond or if the predefined tolerances are exceeded, a new processing data record can be generated at an early time and is used to further process the workpiece in a corrected form in a subsequent processing step.

The comparison of geometry data can occur, for example, as follows. A workpiece is processed in a first processing step in accordance with a first processing data record, after which geometry data of the workpiece are measured. After this, material erosion data are calculated from the measured geometry data of the workpiece, after which the calculated material erosion data are compared with the simulated material erosion data. In a further advantageous configuration, the simulation is carried out in real time in parallel with the real processing of the workpiece or even after the processing of the workpiece in a processing step since it is thus possible also to use data of the real NC core for the virtual NC core. Examples of such data are, in particular, variables such as room temperature, fault messages etc.

In one advantageous configuration, the difference between the measured geometry data and the simulated geometry data or between the measured material erosion data and the simulated material erosion data is calculated, as already mentioned above, after which a processing data record which is provided for a subsequent processing step is modified as a function of a difference threshold being exceeded.

The simulation of the NC core which is carried out with the invention can be carried out, for example, on the open-loop and/or closed-loop control device and/or on a simulation computer.

The invention relates both to the method and to a corresponding system for carrying out the method. The system is embodied in such a way that in addition to a means for simulating the program for operating an open-loop and/or closed-loop control device it also has a means for simulating material erosion. Furthermore, it also advantageously has a means for measuring the workpiece to be processed.

BRIEF DESCRIPTION OF THE DRAWINGS

Examples of further advantages and details result from the following description of an exemplary embodiment. In the drawings, in a basic illustration.

DETAILED DESCRIPTION OF INVENTION

Figure 1:
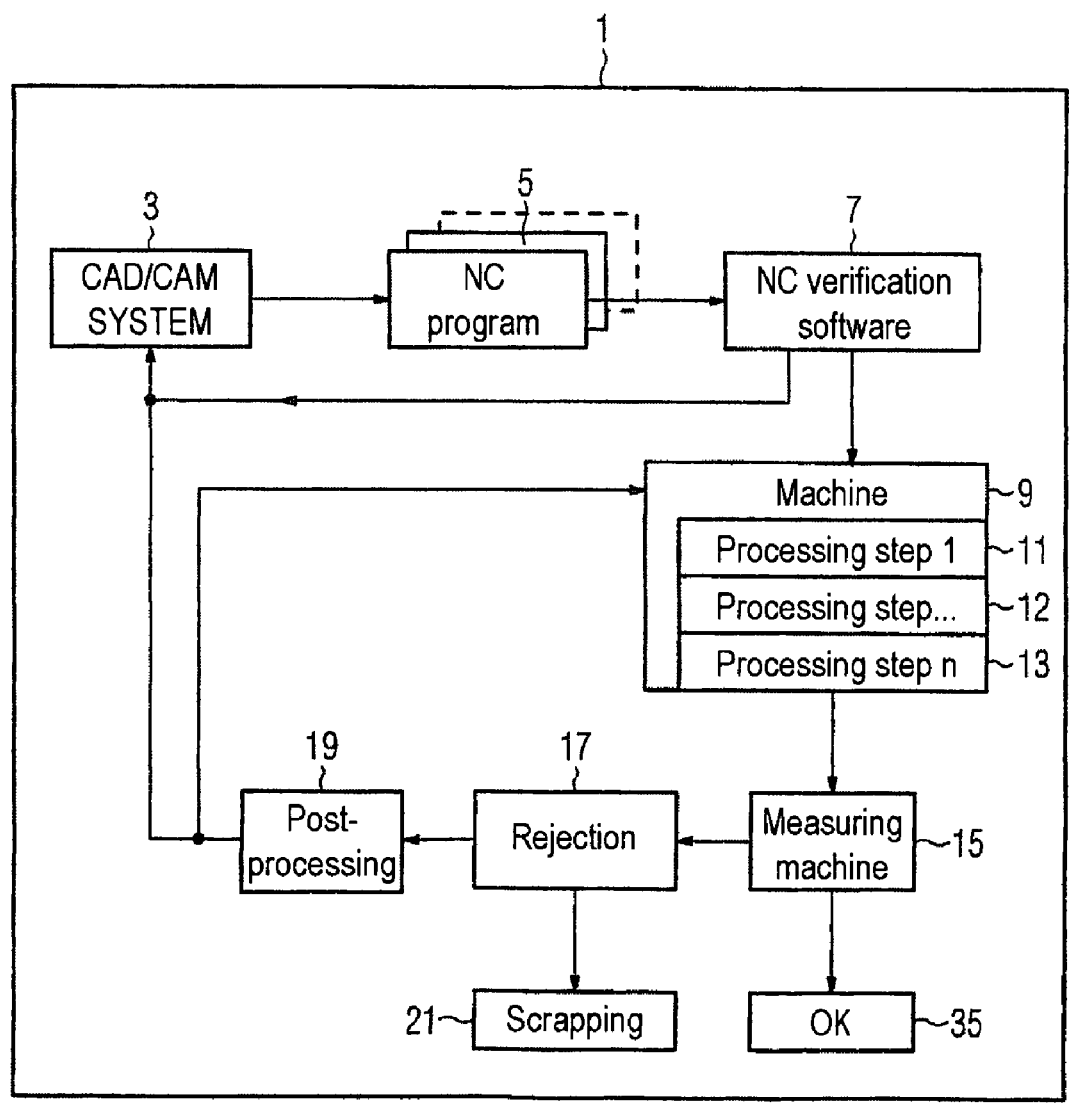
FIG. 1 shows a method according to the previously known prior art for processing a workpiece.

The method sequence 1 illustrated in FIG. 1 is known according to the prior art for the fabrication of complex parts. The complex parts, i.e. parts/workpieces which require processing in a plurality of steps 11, 12, 13 are modeled in a CAD (Computer Aided Design) system 3. Instead of or in addition to the CAD system 3 it would also be possible to use a CAM (Computer Aided Manufacturing) system. The CAD system 3 generates, together with a post-processor, the parts programs 5 which are necessary for the processing of a workpiece. The parts program 5 is a NC program. For the entire operation of the processing of, for example, a workpiece it is possible to generate a single NC program 5 and/or a plurality of NC programs 5 with a plurality of tool changes. However, it is also possible to generate a separate NC program for each tool. The processing with a tool corresponds to a subprocess. The NC programs 5 are then tested with a verification system 7. The verification system 7 has, for example, NC verification software. Vericut® is an example of such verification software. In the verification process, in particular collisions with clamping of the workpiece, for example in a tool machine, and the workpiece are checked. At the same time, an erosion simulation is used to check whether the NC programs produce the desired workpiece geometry. That is to say the result of the erosion simulation is compared with the original CAD model. If the correspondence lies within the specified faults tolerances, the programs are released for fabrication and transmitted to the machine controller of the machine, in particular a processing machine 9. The workpiece is fabricated with the NC programs 5, which can last several hours to days in particular in the case of parts (workpieces) with a high degree of material erosion of, for example, approximately 95%. High degrees of material erosion have, in particular, a material erosion of over 80%. Various steps 11, 12 and 13 of the processing of the workpiece or workpieces are carried out by the processing machine 9. For example, only three processing steps 11, 12 and 13 are shown in the illustration according to FIG. 1 but further steps are indicated in step 12. The workpiece which is finished is then measured on a measuring machine in a measuring step 15 and either certified 35 or rejected 37. This procedure can in turn take several days to weeks. If the workpiece is rejected 17, it can either be re-worked 19 in a post-processing device (if too little material has been removed) or has to be ultimately scrapped 21. In both cases of scrapping 21 and also of post-processing 19, the production must, however, be stopped and the source of the faults determined with painstaking manual work. Finding the source of the fault reduces the rejection rate.

Possible types of faults which have to be or can be advantageously identified are listed below:
a faulty geometry of the parts
a machine fault
incorrect dimensions of a blank
dynamic problems in the processing (for example running-on fault)
faulty clamping of the part/workpiece
tool problems
temperature influences on the processing
deformation of a part/workpiece during the operation of the processing (bending, curvature)

The method which has been known hitherto for processing a workpiece in a plurality of steps can entail at least one of the advantages specified below:
a fault is not detected until after the processing is completed; if a problem already occurs in the first substep, processing is nevertheless continued until the fault is detected; in such a case machine time is lost;
production is continued until the fault is detected; this can mean that a large number of further faulty parts are produced, which entails a corresponding loss of time and material;
the measurement of the parts on the measuring machine 15 requires complex and costly infrastructure;
it is very difficult to assign a problem to a subprocess or to a specific source of faults;
NC verification systems 7 according to the prior art have the disadvantage that the control behavior is emulated; this inevitably leads to situations in which the erosion simulation corresponds only approximately to reality and therefore geometric faults in the parts program cannot always be detected.

Figure 2:
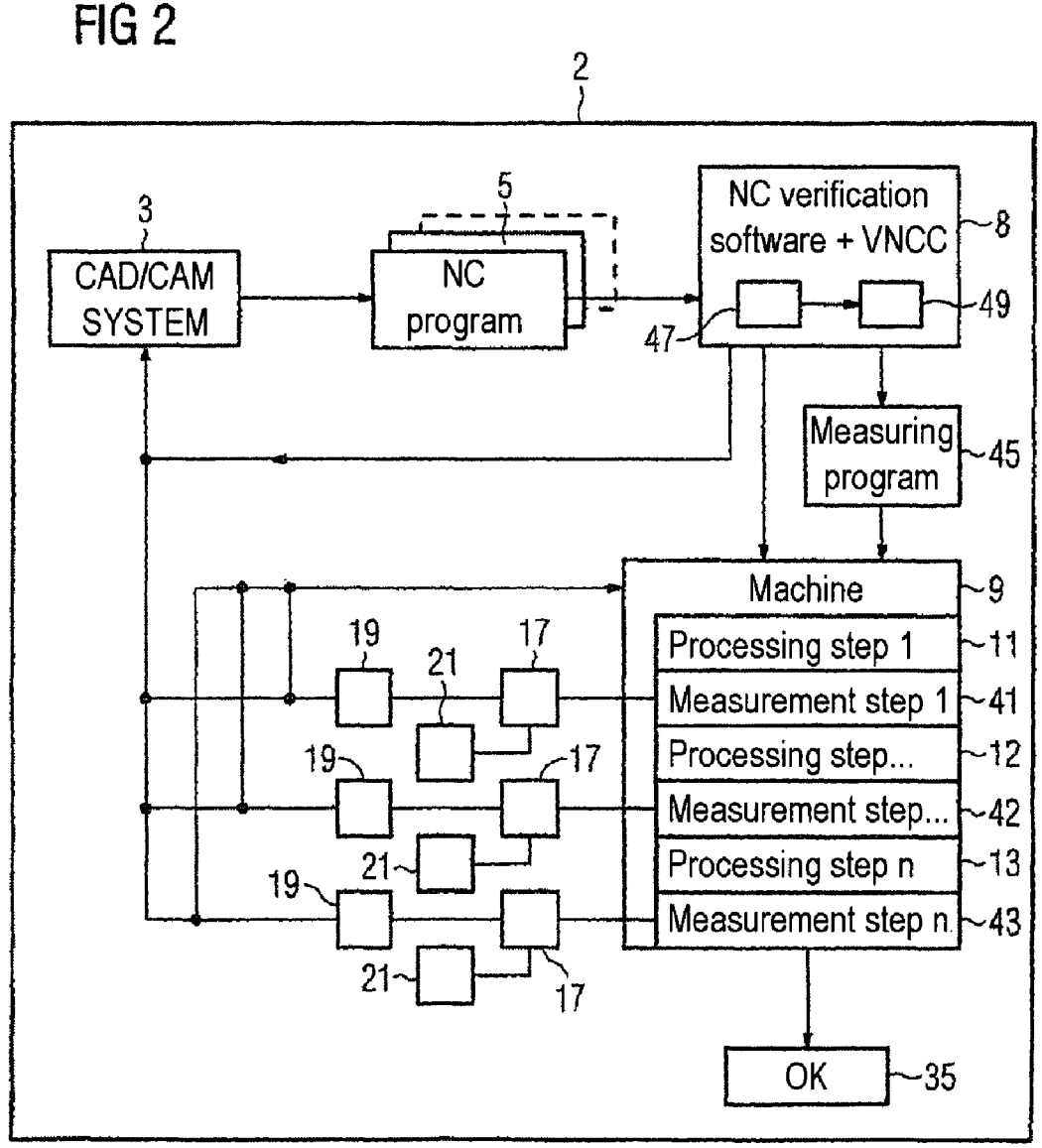
FIG. 2 shows a method according to the invention.

The illustration according to FIG. 2 shows by way of example a method according to the invention for processing a workpiece on a processing machine. The processing machine can be embodied, for example, as a milling machine or else as another machine tool such as for example a drilling machine or turning machine. The processing machine could also be embodied as an industrial robot or as a special machine.

In contrast to FIG. 1, FIG. 2 illustrates NC verification software which includes a virtual NC core VNCC. This results in a verification system 8 which is extended by the VNCC. In this case the emulation software for a CNC system has been replaced by the VNCC. This makes a method sequence 2 which is improved in comparison to FIG. 1 possible. Since the VNCC accurately reproduces the control behavior, relatively small geometric deviations which are generated by control functions such as compressor, rounding of corners or tool corrections can also be detected in the actual simulation. Furthermore, the extended verification system 8 has a material erosion simulation. The material erosion simulation is used to generate a measuring program for each substep 11, 12 or 13 of a processing operation. Previously only the CAD model was available as a reference for the measurement. That is to say only the completely processed part could ever be correctly measured. The extended NC verification software with the subordinate VNCC is now capable of accurately representing the material erosion for each processing step 11, 12 and 13. It is therefore possible after each step to generate a setpoint geometry which corresponds to a CAD model for each process step. It is therefore possible to reference the result of each substep to a geometry model and to generate the predefined setpoint values for checking measurements after each step. These predefined setpoint values are available in the form of measuring programs 45 which can be loaded onto a machine controller. For each processing program or program section there is then the corresponding measuring program 45. It is therefore possible to check the result of each individual processing step 11, 12 and 13 directly on the machine 9 by, for example, introducing a measuring probe and executing the measuring program 45. By comparing the setpoint values and actual values which are both logged it is possible for a machine operator to detect directly whether the result of the processing is in the permitted tolerance range. In the event of a fault, the process is interrupted immediately and a rejection process 17 occurs. The rejection process 17 can be followed, depending on the severity of the fault, by the scrapping process 21 or the re-working process 19. For the re-working process 19, which is advantageously carried out again on the processing machine 9, at least one NC program is generated for re-working using, for example, a CAD/CAM system. If rejection 17 is necessary, a fault analysis can be started. This fault analysis can lead to one or more NC programs 5 being modified. This procedure is significantly easier than the conventional method since the fault can be assigned to a single processing step. Furthermore, a situation is avoided in which valuable machine time is wasted on a part which is already damaged. If the result of each substep is positive, the measuring logs provide the proof that the entire process was successful and the part which is generated corresponds to the specifications. In order to improve the stability of the processing operation it is possible to standardize the processing machine periodically. This is ensured by means of a method which is used to monitor the state of the machine and thus also its geometric quality (electronic fingerprints for machine tools and production machines) at regular time intervals.

The method sequence 2 according to FIG. 2 shows both a verification system 8 which is extended by a VNCC and additional measuring programs 45 for measuring steps 41, 42 and 43. These additional measuring steps 41, 42, and 43 permit each processing step 11, 12 and 13 to be checked. However, it is not absolutely necessary for each processing step also to be followed by a measuring step. The number of measuring steps 41, 42 and 43 is advantageously freely selectable.

Figure 3:
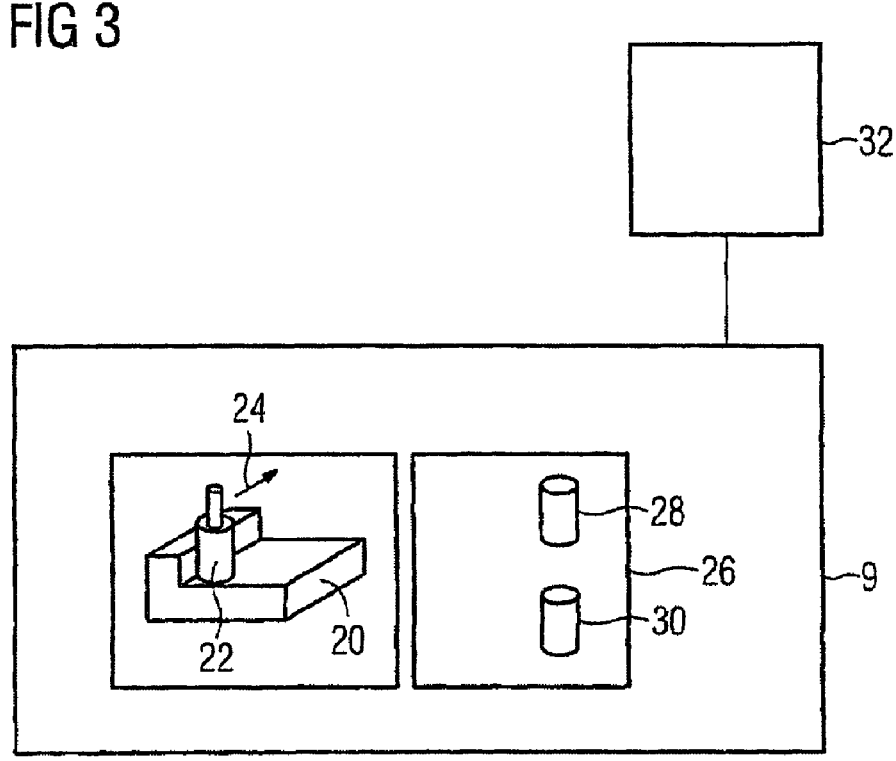
FIG. 3 is a schematic view of a processing machine.

The illustration according to FIG. 3 shows in a schematic form a processing machine 9. The processing machine 9 has an open-loop and/or closed-loop control device 26. This open-loop and/or closed-loop control device 26 is provided for handling processing data records 28. For the handling process, a program 30 is provided. This program is an NC core which serves as a type of operating system of the open-loop and/or closed-loop control system 26. The processing data record 28 is provided with a tool 22 for describing the processing of a workpiece 20. The illustration according to FIG. 3 also shows a simulation computer 32 which can be used, for example, to simulate the NC core. This then corresponds to a virtual NC core (VNCC).

Figure 4:
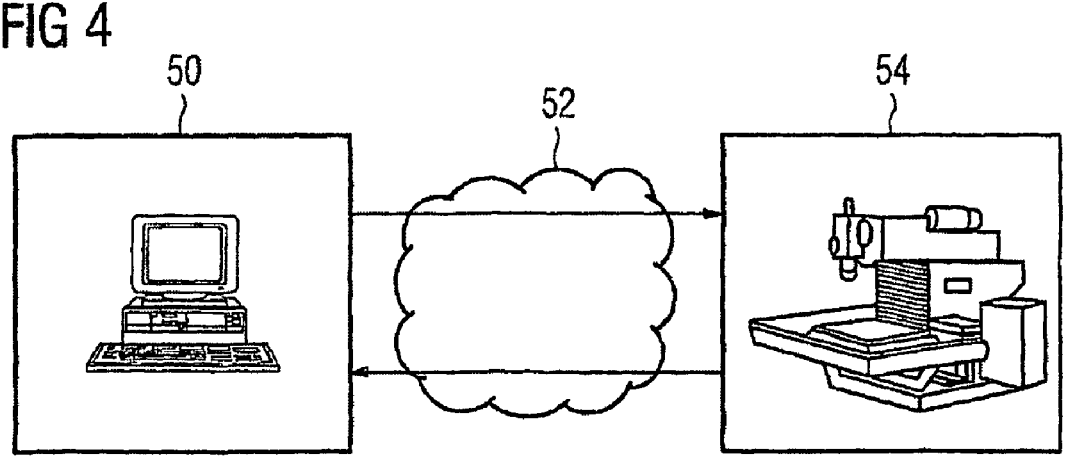
FIG. 4 shows the use of an Intranet and/or of the Internet for improving simulation results.

The illustration according to FIG. 4 shows a computing device 50 for executing work preparation. The work preparation relates, for example, to a control simulation, a simulation system for simulating at least part of an industrial machine and to the possibility of a comparison of setpoint values and actual values. The simulation system has at least one simulation model which can be implemented by means of software and/or hardware. Data such as, for example, simulation results which relate, for example, to the setpoint geometry of a workpiece can be transmitted to an industrial machine 54 by means of an Internet and/or Intranet connection 52. In particular machine data such as also actual values which are recorded and stored during the operation of the industrial machine 54 are present in this industrial machine. The data-transmitting connection via the Internet and/or the Intranet 52 can be used to transmit the machine data or the actual values acquired from the industrial machine 54 for the preparation of work or for the execution of external simulation. In this context, the data used for the simulation of a process on the industrial machine 54 is advantageously current machine data such as, for example, data which is only acquired during the activation of the industrial machine 54. Such data relates, for example, to parameter data of controllers such as for example, amplifications and/or integration times.

The invention claimed is:

1. A method to assure quality when operating an industrial machine for processing a work-piece, comprising:
storing simulation results from a material erosion simulation of at least part of an operation of an industrial machine based on a simulation model wherein the simulation results comprise setpoint values for quality assurance simulated at each of a plurality of processing steps;
receiving real data from the operation of the industrial machine from measurements of the work-piece taken by a measuring program at each of a plurality of processing steps during the processing of the work-piece;
comparing the simulation results and the real data from the operation of the industrial machine at each of the plurality of processing steps during the processing of the work-piece to check whether at each processing step the setpoint values compared to the real data are within a permitted tolerance range based on a geometric deviation from the setpoint values;
interrupting the operation of the industrial machine and automatically rejecting the work-piece based upon a result of comparison of the simulation results and the real data at a particular processing step during the processing of the work-piece in which the result of the comparison is outside the permitted tolerance range indicating a fault, thereby avoiding further processing steps being continued if the fault is detected; assigning the detected fault to the particular processing step for which the fault is detected to identify a specific source of the fault for fault analysis; and scrapping or re-working the rejected work-piece at the particular processing step depending on a severity of the detected fault.

2. The method as claimed in claim 1, wherein the industrial machine is selected from the group consisting of a processing machine, a production machine and an automated manipulation device.

3. The method as claimed in claim 1, wherein the simulation is performed on the industrial machine, wherein a parametrization of the simulation model is made at least partially based on a device for parametrizing the simulation model.

4. The method as claimed in claim 3, wherein a data-transmitting connection is set up at least partially via an Intranet or an Internet connection between the industrial machine and the device for parametrizing the simulation model.

5. The method as claimed in claim 1, wherein the simulation is performed by an external simulation device.

6. The method as claimed in claim 5, wherein the external simulation device has a data link at least partially based on an Intranet or an Internet connection.

7. The method as claimed in claim 1, wherein:
the industrial machine is a numerically-controlled processing machine and numerical-control verification software is used for the simulation.

8. The method as claimed in claim 1, wherein two or more processing steps are provided for processing the work-piece, wherein material erosion data simulated from the simulation data are generated based on a material erosion simulation.

9. The method as claimed in claim 1, wherein comparing the simulation results and the real data occurs at each step during the processing of the work-piece by comparing setpoint values from the simulation and actual values from the operation of the industrial machine to avoid the process being continued if a fault is detected.

10. The method as claimed in claim 8, wherein simulated geometry data of the work-piece are generated from the material erosion data.

11. The method as claimed in claim 9, wherein simulated geometry data of the work-piece are generated from material erosion data of a material erosion simulation.

12. The method as claimed in claim 10, wherein a work-piece is processed in accordance with a first processing data record in a first processing step, and geometry data of the work-piece are measured, after which the measured geometry data of the work-piece are compared with the simulated geometry data.

13. The method as claimed in claim 8, wherein the work-piece is processed in accordance with a first working data record in a first processing step, and geometry data of the work-piece are measured, after which material erosion data are calculated from the measured geometry data of the work-piece, after which the calculated material erosion data are compared with the simulated material erosion data.

14. The method as claimed in claim 12, wherein the work-piece is processed in accordance with a first working data record in a first processing step, and geometry data of the work-piece are measured, after which material erosion data are calculated from the measured geometry data of the work-piece, after which the calculated material erosion data are compared with the simulated material erosion data.

15. The method as claimed in claim 13, wherein a difference between the measured geometry data and the simulated geometry data or between the measured material erosion data and the simulated material erosion data is calculated, after which a processing data record which is provided for a subsequent processing step is modified as a function of a difference threshold being exceeded.

16. The method as claimed in claim 8, wherein the processing data record is created using a CAD/CAM system.

17. The method as claimed in claim 8, wherein simulated data, measured data and calculated data are transferred to the CAD/CAM system.

18. The method as claimed in claim 8, wherein the simulation is processed on the control device.

19. The method as claimed in claim 16, wherein the simulation is processed on the control device.

20. The method as claimed in claim 17, wherein the simulation is processed on the control device.

* * * * *